United States Patent
Podschwadt

(10) Patent No.: US 12,500,474 B2
(45) Date of Patent: Dec. 16, 2025

(54) ELECTRIC DRIVE UNIT HAVING A FLUID JACKET

(71) Applicant: Schaeffler Technologies AG & Co. KG, Herzogenaurach (DE)

(72) Inventor: Maximilian Podschwadt, Saline, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 379 days.

(21) Appl. No.: 18/160,054

(22) Filed: Jan. 26, 2023

(65) Prior Publication Data

US 2024/0258869 A1 Aug. 1, 2024

(51) Int. Cl.
*H02K 5/20* (2006.01)
*B60K 11/02* (2006.01)
(Continued)

(52) U.S. Cl.
CPC .............. *H02K 5/203* (2021.01); *H02K 5/15* (2013.01); *H02K 5/18* (2013.01); *B60K 11/02* (2013.01); *H02K 5/124* (2013.01)

(58) Field of Classification Search
CPC .......... H02K 5/203; H02K 5/15; F28D 7/026; F28D 2021/0078; F28D 2015/0291; F28D 15/02; F28D 15/0233; F28D 15/0241; F28D 15/0266; F28D 2021/0028; F28D 2021/004; F28D 20/02; F28D 2021/0029; F28D 11/04; F28D 15/0208; F28D 20/021; F28D 2001/0273; F28D 2020/006; F28D 2020/0078; F28D 1/04; F28D 1/0473; F28D 1/05316; F28D 15/0275; F28D 2021/008;
(Continued)

(56) References Cited

U.S. PATENT DOCUMENTS 6,329,731 B1 * 12/2001 Arbanas ................ F16H 57/043
310/58
11,408,495 B2 8/2022 Blischak et al.
(Continued)

FOREIGN PATENT DOCUMENTS

| CN | 112186967 A | 1/2021 | |
|---|---|---|---|
| DE | 102011079157 A1 | 1/2013 | |
| WO | WO-2021166171 A1 * | 8/2021 | ............. H02K 1/185 |

OTHER PUBLICATIONS

English Translation of WO2021166171A1 (Year: 2021).*
(Continued)

*Primary Examiner* — Terrance L Kenerly
*Assistant Examiner* — Theodore L Perkins
(74) *Attorney, Agent, or Firm* — Price Heneveld LLP

(57) ABSTRACT

An electric drive unit including a housing that includes an outer wall and a bearing shield that extends radially inboard from the outer wall, a stator disposed within the housing radially inboard of the outer wall, and a stator carrier having a first portion positioned radially between the stator and the outer wall and extending along the stator and a second portion that extends radially inboard from the first portion to a radially inboard terminus that is positioned radially inboard of the stator. The stator carrier and the housing define a fluid jacket. The fluid jacket has a first region that is defined by the outer wall and the first portion and a second region that is defined by the bearing shield and the second portion.

18 Claims, 6 Drawing Sheets

(51) Int. Cl.
   *H02K 5/124* (2006.01)
   *H02K 5/15* (2006.01)
   *H02K 5/18* (2006.01)

(58) Field of Classification Search
   CPC .......... F28D 7/024; F28D 5/203; F28F 13/08;
         F28F 13/06; F28F 2250/02; F28F 3/12;
         F28F 13/12; F28F 2265/12; F28F
         2265/14; F28F 3/086; F28F 21/084; F28F
         2210/02; F28F 2255/14; F28F 19/008;
         F28F 3/04; F28F 5/00; F28F 1/422; F28F
                                                3/027
   USPC .......................................................... 310/54
   See application file for complete search history.

(56) References Cited

U.S. PATENT DOCUMENTS

| | | | |
|---|---|---|---|
| 2014/0319936 A1* | 10/2014 | Makino | H02K 9/00 |
| | | | 310/43 |
| 2015/0028727 A1* | 1/2015 | Watanabe | H02K 1/2706 |
| | | | 310/60 A |
| 2017/0077786 A1* | 3/2017 | Chernogorski | H02K 5/203 |
| 2022/0209619 A1* | 6/2022 | Fujimoto | H02K 5/203 |

OTHER PUBLICATIONS

"Audi e-tron electric motors & setup," Electric Has Gone Audi, https://electrihasgoneaudi.net/models/e-tron/drivetrain/motor, accessed Nov. 2, 2022, 10 pages.

\* cited by examiner

ELECTRIC DRIVE UNIT HAVING A FLUID JACKET

FIELD OF THE DISCLOSURE

The present disclosure generally relates to an electric drive unit for a vehicle. More specifically, the present disclosure relates to a fluid jacket defined by a housing and a stator carrier of an electric drive unit.

BACKGROUND OF THE DISCLOSURE

Electric drive units can include water jackets that are disposed radially outboard of a stator of an electric drive unit for transferring heat from the stator to fluid within the water jacket. Electric drive units include a variety of components that can benefit from cooling via heat transfer.

SUMMARY OF THE DISCLOSURE

According to a first aspect of the present disclosure, an electric drive unit includes a housing that includes an outer wall and a bearing shield that extends radially inboard from the outer wall, a stator disposed within the housing radially inboard of the outer wall, and a stator carrier having a first portion positioned radially between the stator and the outer wall and extending along the stator and a second portion that extends radially inboard from the first portion to a radially inboard terminus that is positioned radially inboard of the stator. The stator carrier and the housing define a fluid jacket. The fluid jacket has a first region that is defined by the outer wall and the first portion and a second region that is defined by the bearing shield and the second portion.

Embodiments of the first aspect of the disclosure can include any one or a combination of the following features:
- a first seal positioned between the outer wall of the housing and the first portion of the stator carrier, wherein the first seal is positioned radially inboard of the outer wall and radially outboard of the stator, and a second seal positioned between the bearing shield of the housing and the second portion of the stator carrier, wherein the second seal is positioned radially inboard of the stator carrier and radially outboard of the bearing shield;
- the stator carrier is an integrally formed single unitary body;
- the first portion of the stator carrier includes at least one rib that spirals along a surface of the stator carrier opposite the stator;
- stator carrier includes an annular collar press fit with the housing and extending between the first and second regions of the fluid jacket, wherein the annular collar defines at least one opening that allows fluid to flow from the first region to the second region;
- the at least one opening defined by the annular collar includes a first opening, and a second opening positioned elevationally downward of the first opening, wherein the second opening is larger than the first opening;
- a fluid inlet that conveys fluid into the first region of the fluid jacket, and a fluid outlet that conveys fluid out of the second region of the fluid jacket; and
- the bearing shield includes a first surface that defines the second region of the fluid jacket together with the stator carrier, and a second surface opposite the first surface that defines a gearbox region of the housing.

According to a second aspect of the present disclosure, an electric drive unit includes a housing, a stator disposed within the housing, and a stator carrier operably coupled with the stator. The housing and the stator carrier define a fluid jacket for conveying fluid. Further, a portion of the fluid jacket is defined radially inboard of the stator.

Embodiments of the second aspect of the disclosure can include any one or a combination of the following features:
- the housing includes an outer wall, and a bearing shield that extends radially inboard from the outer wall, wherein the portion of the fluid jacket that is defined radially inboard of the stator is defined by the stator carrier and the bearing shield;
- the stator carrier includes a first portion, and a second portion that extends radially inboard from the first portion to a radially inboard terminus that is positioned radially inboard of the stator;
- the fluid jacket includes a first region that is defined by the outer wall and the first portion and a second region that is defined by the bearing shield and the second portion, wherein the second region includes the portion of the fluid jacket that is defined radially inboard of the stator;
- the stator carrier includes an annular collar press fit with the housing and extending between the first and second regions of the fluid jacket, wherein the annular collar defines at least one opening that allows fluid to flow from the first region to the second region;
- the at least one opening defined by the annular collar includes a first opening, and a second opening positioned elevationally downward of the first opening, wherein the second opening is larger than the first opening;
- a first seal positioned between the housing and the stator carrier radially outboard of the stator, and a second seal positioned between the housing and the stator carrier radially inboard of the stator; and
- the first seal is positioned radially inboard of the housing and radially outboard of the stator carrier, and the second seal is positioned radially inboard of the stator carrier and radially outboard of the housing.

According to a third aspect of the present disclosure, an electric drive unit includes a housing, a stator disposed within the housing, and a stator carrier disposed about the stator and having an annular collar that abuts the housing and defines at least one opening. The stator carrier and the housing define a fluid jacket that includes a first region and a second region that is in communication with the first region via the at least one opening.

Embodiments of the third aspect of the disclosure can include any one or a combination of the following features:
- the at least one opening defined by the annular collar includes a first opening, and a second opening positioned elevationally downward of the first opening, wherein the second opening is larger than the first opening;
- the housing includes an outer wall, and a bearing shield that extends radially inboard from the outer wall, wherein the first region of the fluid jacket is defined by the stator carrier and the outer wall, and the second region of the fluid jacket is defined by the stator carrier and the bearing shield; and
- a portion of the second region is positioned radially inboard of the stator.

These and other features, advantages, and objects of the present disclosure will be further understood and appreciated by those skilled in the art by reference to the following specification, claims, and appended drawings.

Figure 1:
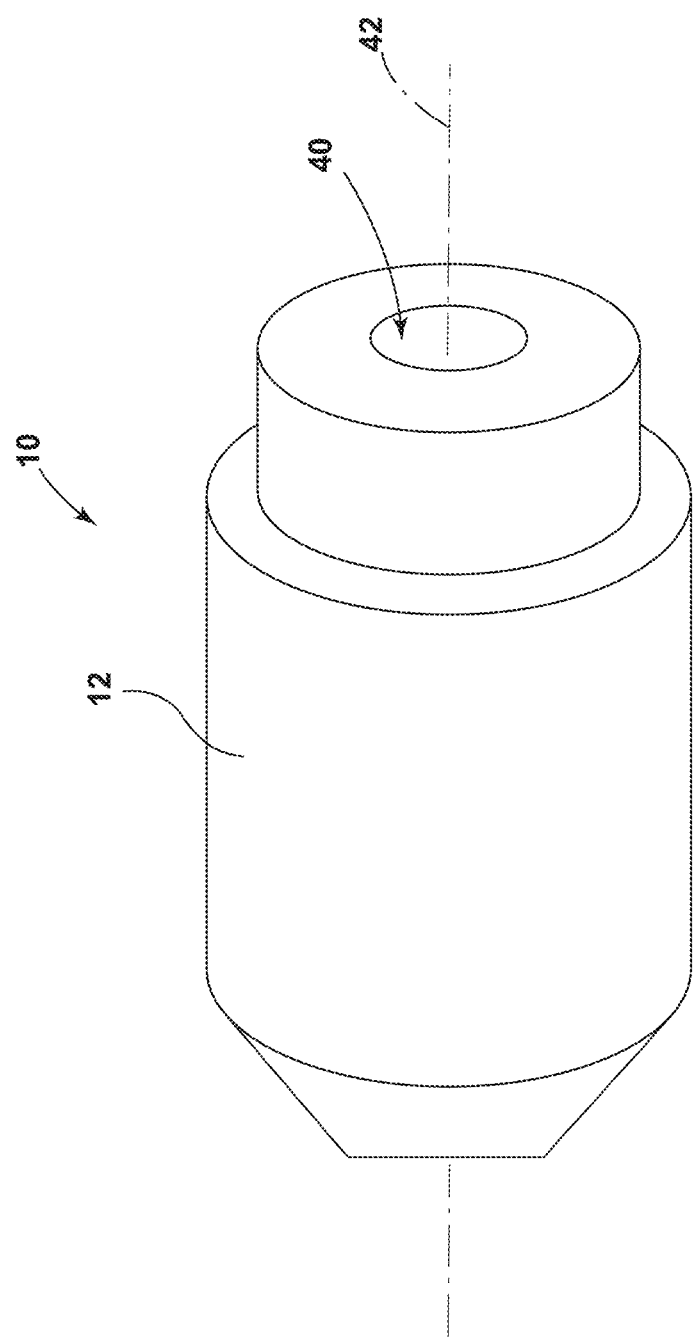
FIG. 1 is a side perspective view of an electric drive unit.
Figure 2:
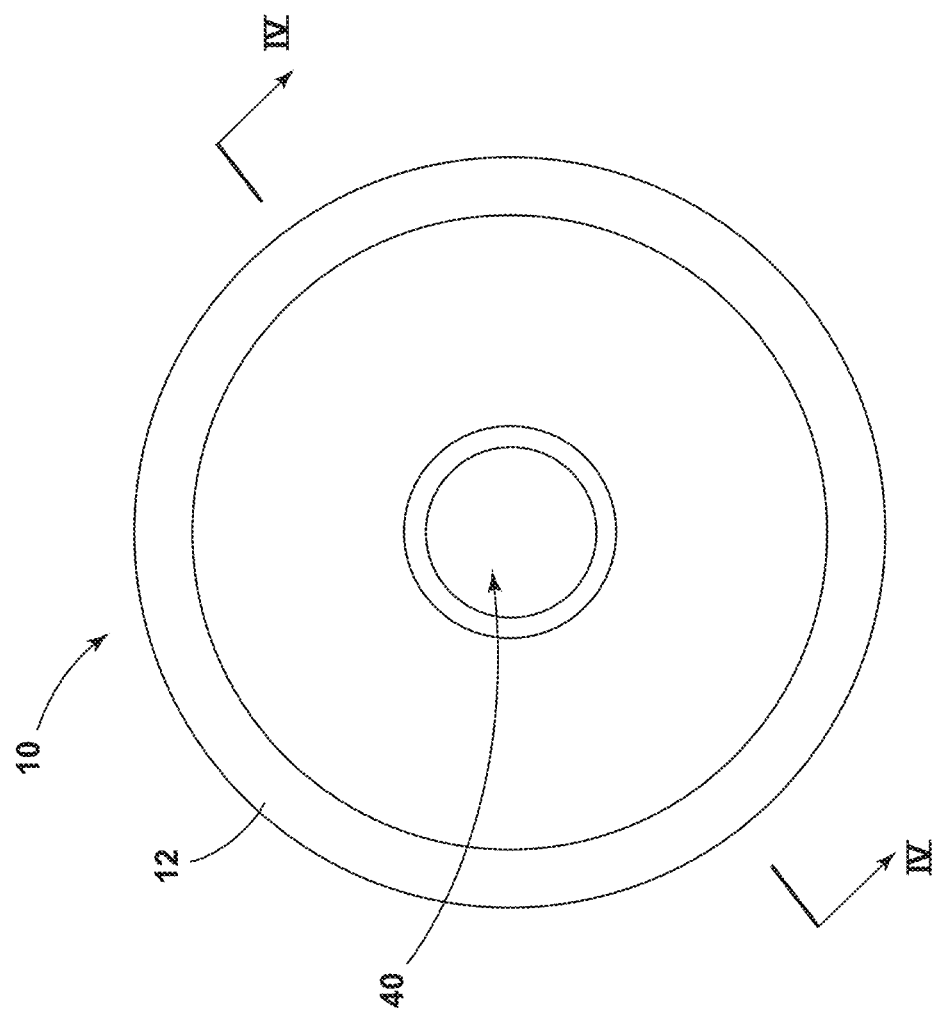
FIG. 2 is a side elevational view of an electric drive unit.
Figure 3:
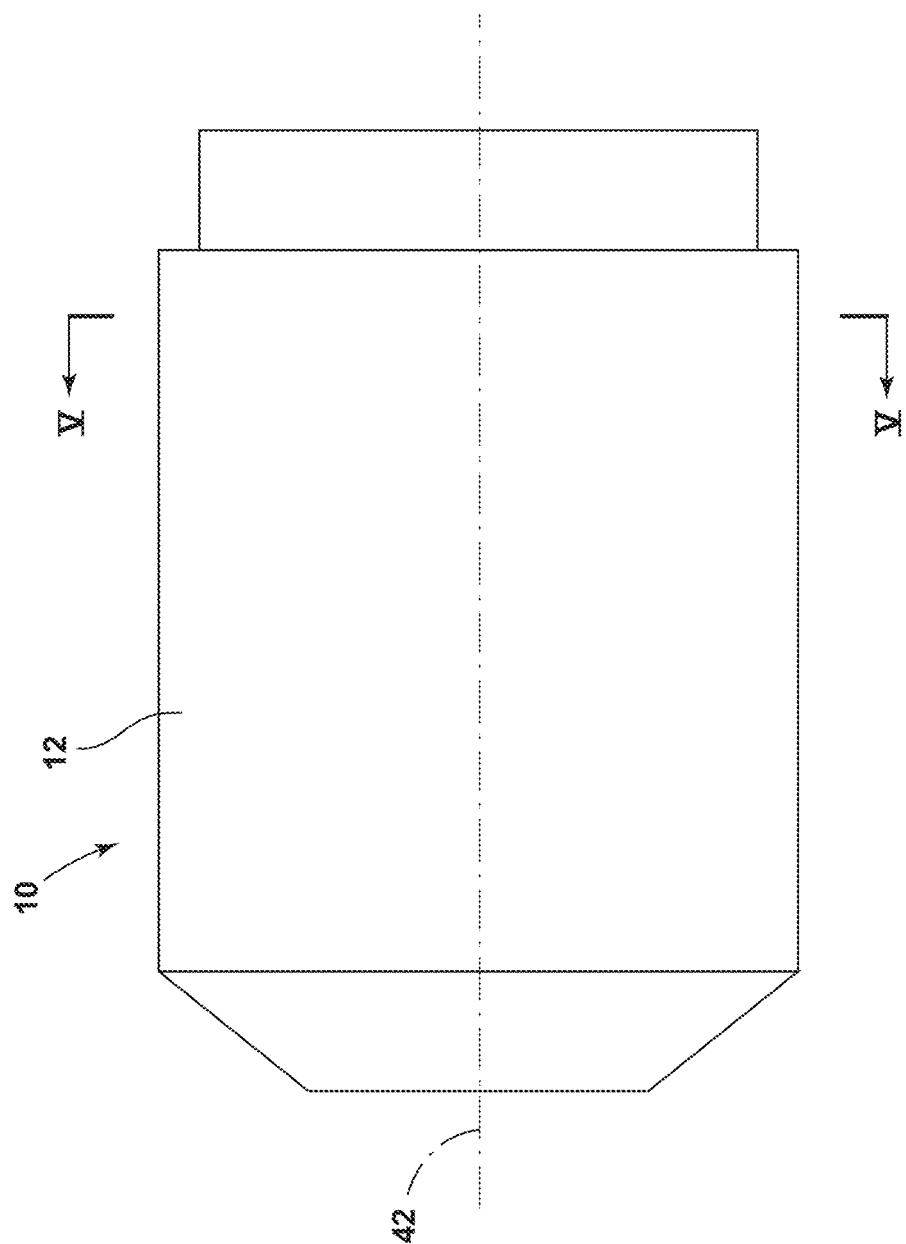
FIG. 3 is a front elevational view of an electric drive unit.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a rotor shaft configured to rotate in operation of the apparatus described herein. Further, the term "radial" and derivatives thereof, such as "radially," shall be understood in relation to the axis of the aforementioned rotor shaft. For example, "radially outboard" refers to further away from the axis, while "radially inboard" refers to nearer to the axis.

Referring now to FIGS. 1-6, an electric drive unit 10 includes a housing 12. The housing 12 includes an outer wall 14 and a bearing shield 16 that extends radially inboard from the outer wall 14. A stator 18 is disposed within the housing 12 radially inboard of the outer wall 14 and in an axially-spaced relationship with the bearing shield 16. A stator carrier 20 includes a first portion 22 and a second portion 24 integrally formed as a single unitary body with one another. The first portion 22 is positioned radially between the stator 18 and the outer wall 14 and extends along the stator 18. The second portion 24 extends radially inboard from the first portion 22 to a radially inboard terminus 26 that is positioned radially inboard of the stator 18. The second portion 24 extends axially between the stator 18 and the bearing shield 16. The stator carrier 20 and the housing 12 define a fluid jacket 28. The fluid jacket 28 includes a first region 30 that is defined by the outer wall 14 of the housing 12 and the first portion 22 of the stator carrier 20 and a second region 32 that is defined by the bearing shield 16 of the housing 12 and the second portion 24 of the stator carrier 20.

Figure 4:
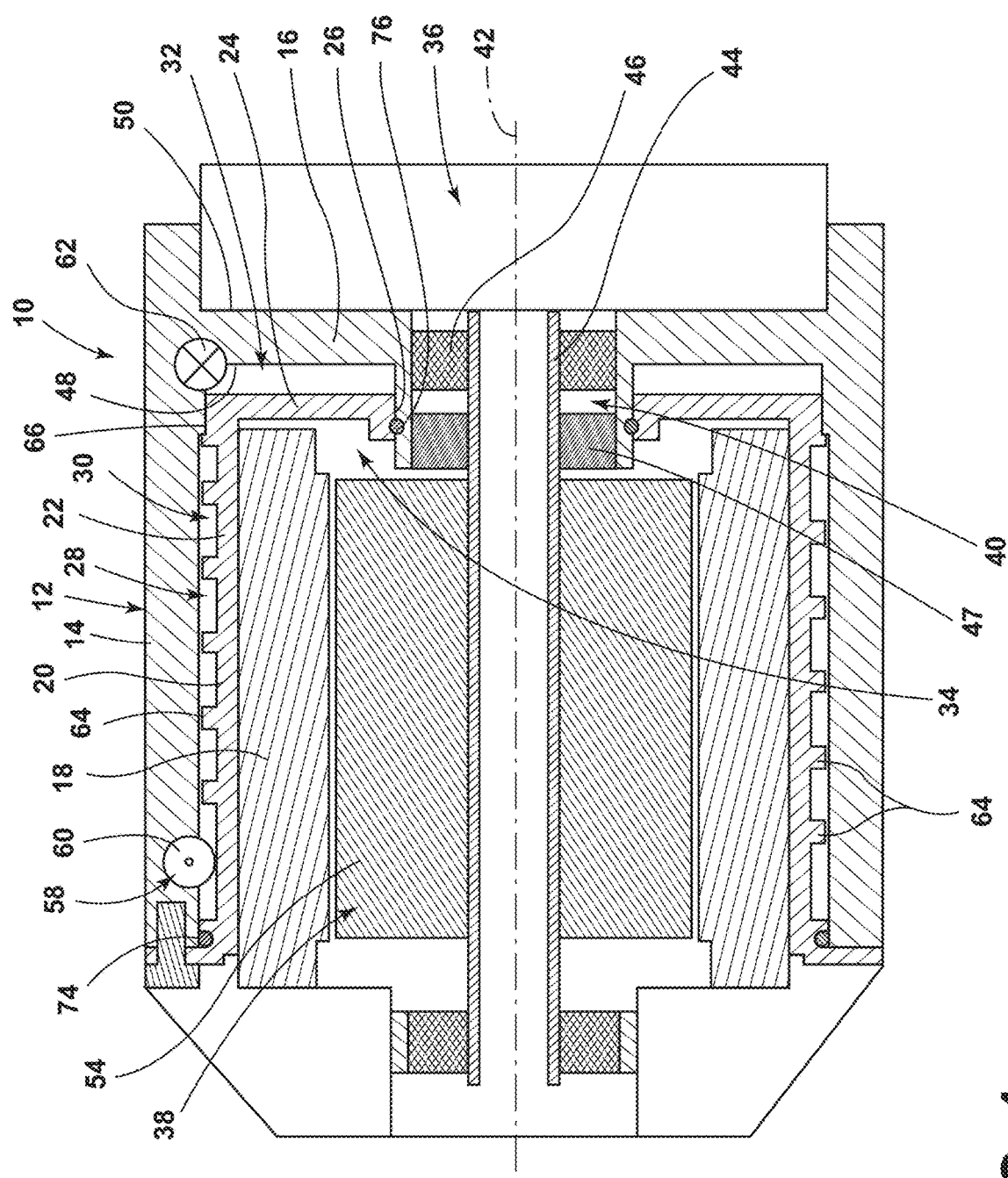
FIG. 4 is a cross-sectional view of the electric drive unit of FIG. 2 taken at line IV-IV, illustrating a fluid jacket defined by a housing and a stator carrier.

Referring now to FIGS. 1-4, the electric drive unit 10 includes the housing 12. The housing 12 can be an assembly of a plurality of components, in some examples. For example, the housing 12 can be a die-cast aluminum housing 12 that is formed of a plurality of components. The housing 12 can define a motor housing region 34 and a gearbox region 36. A motor 38 of the electric drive unit 10 can be housed within the motor housing region 34. The gearbox region 36 defined by the housing 12 can contain a plurality of electric drive unit components, such as a gearset and a differential (not shown). Further, the gearbox region 36 may serve as a reservoir for oil. The housing 12 includes the outer wall 14. The outer wall 14 can extend generally circumferentially about the motor 38 of the electric drive unit 10. The housing 12 further includes the bearing shield 16. The bearing shield 16 extends radially inboard from the outer wall 14 and is arranged to separate the oil cavity of the gearbox region 36 from the dry cavity of the motor housing region 34. As illustrated in FIG. 4, the bearing shield 16 can define a central aperture 40. An axis 42 about which a rotor shaft 44 of the motor 38 is configured to rotate, as described further herein, may extend through the central aperture 40, in various embodiments. A bearing 46 can be positioned radially between the bearing shield 16 and the rotor shaft 44 of the motor 38, as illustrated in FIG. 4. The bearing 46 can support and facilitate rotation of the rotor shaft 44 about the axis 42. A dynamic seal 47 may be arranged between the bearing shield 16 and the rotor shaft 44 to prevent or block oil from entering the motor housing region 34. As illustrated in FIG. 4, the bearing shield 16 includes a first surface 48 that faces the motor housing region 34 and a second surface 50 opposite the first surface 48 that defines the gearbox region 36 of the housing 12.

Referring now to FIG. 4, the electric drive unit 10 includes the motor 38. The motor 38 includes the stator 18, a rotor 54, and the rotor shaft 44. In an exemplary embodiment, operation of the motor 38 drives rotation of the rotor shaft 44 about the axis 42, which may drive first and second output shafts (not shown) that are operably coupled to the rotor 54 via a gearset and differential (not shown) disposed within the gearbox region 36 defined by the housing 12. A variety of types of electric motors 38 are contemplated for use in the electric drive unit 10. For example, the motor 38 can be an induction motor 38. As illustrated in FIG. 4, the rotor shaft 44 is positioned radially inboard of the rotor 54 and stator 18 and extends axially through the rotor 54 of the motor 38. Further, the stator 18 is disposed within the housing 12 radially inboard of the outer wall 14 of the housing 12, and the stator 18 is in an axially-spaced relationship with the bearing shield 16 of the housing 12.

Figure 5:
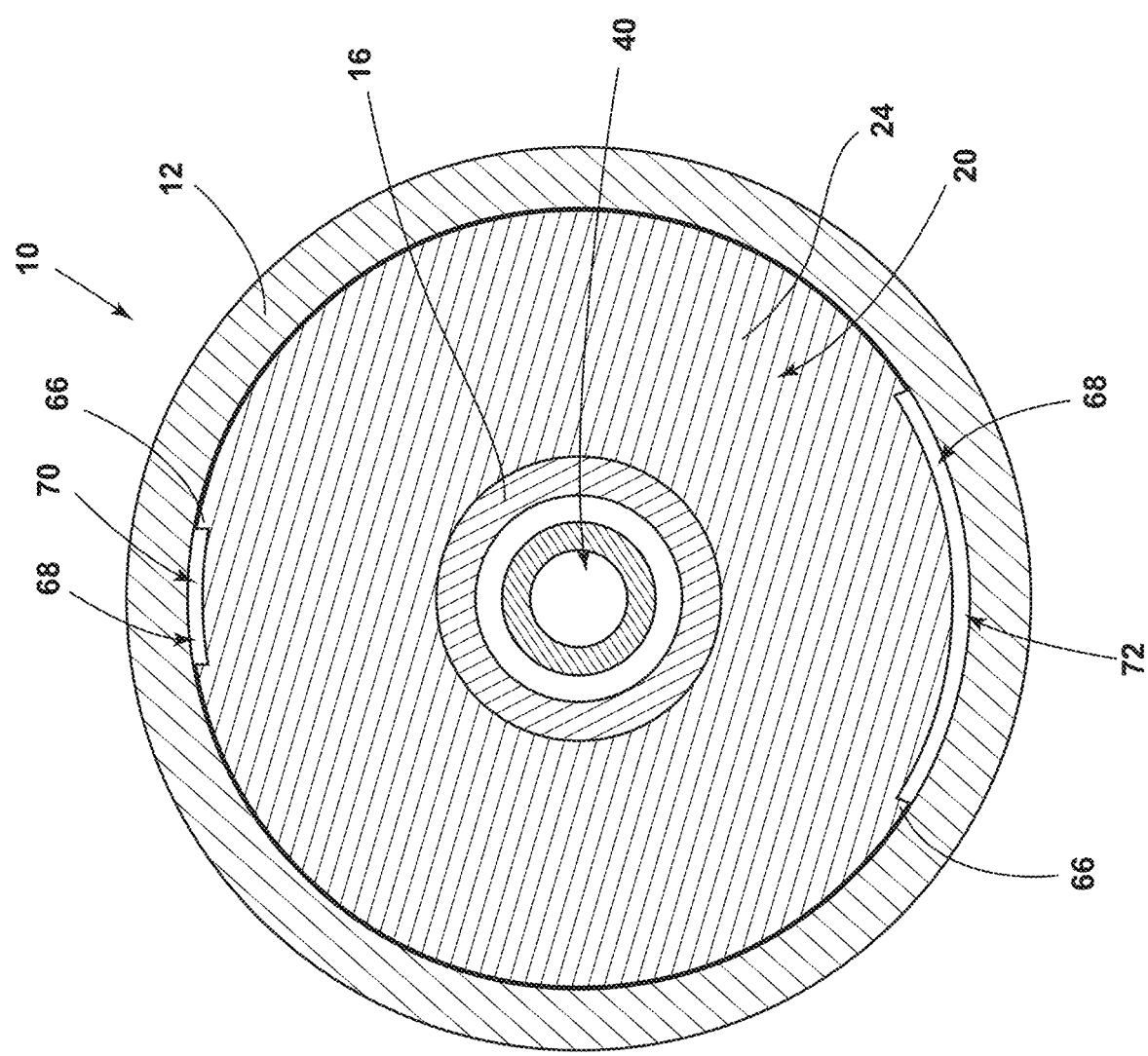
FIG. 5 is a cross-sectional view of the electric drive unit of FIG. 3 taken at line V-V, illustrating a housing and an annular collar of a stator carrier that is radially inboard of the housing defining a first opening and a second opening.
Figure 6:
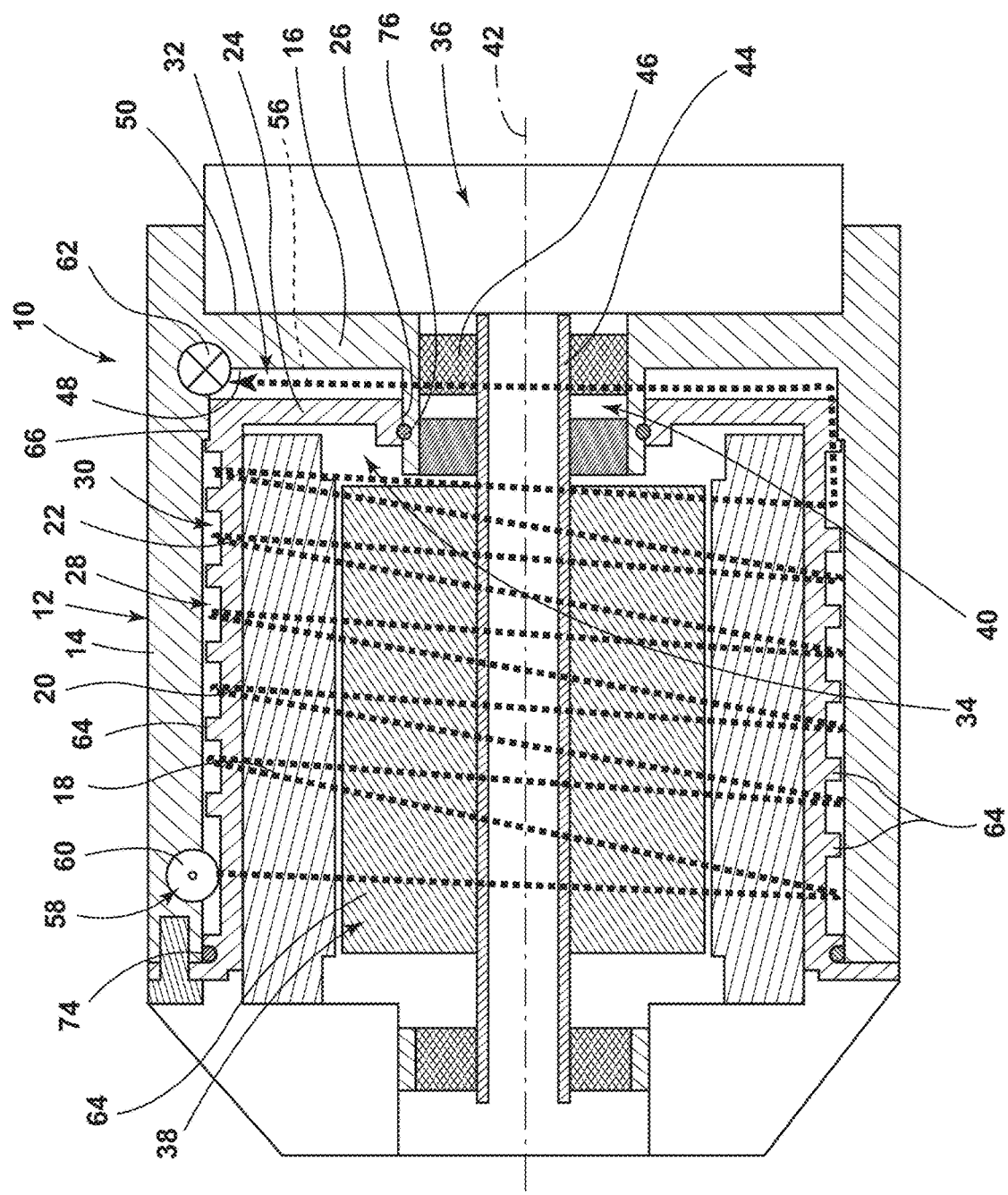
FIG. 6 is a cross-sectional view of an electric drive unit, illustrating a flow path of fluid within a fluid jacket defined by a housing and a stator carrier of the electric drive unit.

Referring now to FIGS. 4-6, the stator carrier 20 is operably coupled with the stator 18. In one embodiment, the stator 18 can be coupled to an inner surface of the stator carrier 20 via a shrink fit arrangement; however, other methods can be utilized, in various implementations. The stator carrier 20 can include the first and second portions 22, 24. As illustrated in FIG. 4, the first portion 22 of the stator carrier 20 is positioned radially between the stator 18 and the outer wall 14 and extends along the stator 18. The second portion 24 extends radially inboard from a terminal end of the first portion 22. As illustrated in FIG. 4, the second portion 24 extends radially inboard from the first portion 22 to the radially inboard terminus 26 of the stator carrier 20. The radially inboard terminus 26 of the stator carrier 20 is the radially inboard-most portion of the second portion 24 of the stator carrier 20. In the embodiment illustrated in FIG. 4, the radially inboard terminus 26 of the second portion 24 of the stator carrier 20 is positioned radially inboard of the stator 18.

Referring still to FIGS. 4-6, the stator carrier 20 and the housing 12 define the fluid jacket 28. The fluid jacket 28 is configured to convey fluid 56 for removal of heat from the electric drive unit 10. In various embodiments, the fluid jacket 28 is a portion of a fluid circuit 58 through which fluid 56 is cyclically circulated. In the embodiment illustrated in FIG. 4, the electric drive unit 10 includes a fluid inlet 60 that conveys fluid 56 into the first region 30 of the fluid jacket 28 and a fluid outlet 62 that conveys fluid 56 out of the second region 32 of the fluid jacket 28. In an exemplary embodiment, the fluid 56 is a water-glycol mixture; however, other fluids may be utilized, in various implementations. The fluid 56 that flows within the fluid circuit 58 and, more particularly, the fluid jacket 28 may be configured to cool various components of the electric drive unit 10 and/or other fluids utilized in the electric drive unit 10, as described further herein.

Referring now still to FIGS. 4-6, the fluid jacket 28 can include the first region 30 and the second region 32. The first region 30 of the fluid jacket 28 can be defined by the stator carrier 20 and the outer wall 14 of the housing 12. The second region 32 can be defined by the stator carrier 20 and the bearing shield 16 of the housing 12. In the embodiment illustrated in FIG. 4, the first region 30 is defined by the outer wall 14 of the housing 12 and the first portion 22 of the stator carrier 20, and the second region 32 is defined by the bearing shield 16 of the housing 12 and the second portion 24 of the stator carrier 20. In the illustrated embodiment, the first surface 48 of the bearing shield 16 defines the second region 32 of the fluid jacket 28 together with the stator carrier 20, while the second surface 50 that is opposite the first surface 48 defines the gearbox region 36 of the housing 12.

Referring now to FIG. 4, in some embodiments, a portion of the fluid jacket 28 is defined radially inboard of the stator 18 of the motor 38. In some implementations, the portion of the fluid jacket 28 that is defined radially inboard of the stator 18 is defined by the stator carrier 20 and the bearing shield 16. In the embodiment illustrated in FIG. 4, the portion of the fluid jacket 28 that is defined radially inboard of the stator 18 is defined by the second portion 24 of the stator carrier 20 and the bearing shield 16 of the housing 12. As illustrated in FIG. 4, the second region 32 of the fluid jacket 28 includes the portion of the fluid jacket 28 that is defined radially inboard of the stator 18. As illustrated in FIG. 4, the second region 32 of the fluid jacket 28 is disposed axially between the gearbox region 36 and the stator 18 of the motor 38.

Referring now to FIGS. 4 and 6, the first portion 22 of the stator carrier 20 can include at least one rib 64 that spirals along a surface of the stator carrier 20 opposite the stator 18. The at least one rib 64 may be a single rib 64 that spirals along the stator carrier 20, in some embodiments. It is contemplated that the at least one rib 64 may be a plurality of ribs 64 that collectively spiral along the surface of the stator carrier 20 opposite the stator 18. The at least one rib 64 may be configured to deliver fluid 56 through the first region 30 of the fluid jacket 28 in a spiraling manner, which may enhance uniform heat transfer from the stator 18 to the fluid 56 within the fluid jacket 28.

Referring now to FIGS. 4-6, the stator carrier 20 includes an annular collar 66. The annular collar 66 can be coupled with the housing 12 and may extend between the first and second regions 30, 32 of the fluid jacket 28. In various implementations, the annular collar 66 can abut the housing 12 of the electric drive unit 10. For example, in the embodiment illustrated in FIG. 4, the annular collar 66 extends radially outboard from the adjacent portion of the stator carrier 20 and is press fit with the corresponding portion of the housing 12 of the electric drive unit 10. In various embodiments, the annular collar 66 defines at least one opening 68. The at least one opening 68 is configured to allow fluid 56 to flow from the first region 30 of the fluid jacket 28 to the second region 32 of the fluid jacket 28.

The at least one opening 68 defined by the annular collar 66 of the stator carrier 20 can include a plurality of openings 68. For example, the at least one opening 68 can include a first opening 70 and a second opening 72, as illustrated in FIG. 5. The second opening 72 can be positioned elevationally downward of the first opening 70. In other words, when the electric drive unit 10 is assembled with a vehicle, the second opening 72 can be positioned vehicle-downward of the first opening 70. In some implementations, the second opening 72 is larger than the first opening 70. For example, in the embodiment illustrated in FIG. 5, the second opening 72 is positioned elevationally downward of the first opening 70, and the second opening 72 is larger than the first opening 70. The at least one opening 68 may be a variety of types of openings 68 defined by the annular collar 66. For example, the at least one opening 68 may be an aperture that extends through the annular collar 66, in some implementations. In the embodiment illustrated in FIG. 5, the first and second openings 70, 72 are recesses defined by the annular collar 66. As such, the at least one opening 68 is defined by the recess in the annular collar 66 and the housing 12, as illustrated in FIG. 5.

In various implementations, the annular collar 66 extends between the first and second regions 30, 32 of the fluid jacket 28. For example, in the embodiment illustrated in FIG. 6, fluid 56 flowing within the fluid circuit 58 is conveyed into the first region 30 of the fluid jacket 28 via the fluid inlet 60. The fluid 56 then spirals about the stator carrier 20 along the at least one spiraling rib 64 to the second opening 72 defined by the annular collar 66. The fluid 56 passes through the second opening 72 from the first region 30 of the fluid jacket 28 to the second region 32 of the fluid jacket 28 and then is conveyed out of the second region 32 of the fluid jacket 28 via the fluid outlet 62.

Referring now to FIGS. 4 and 6, the electric drive unit 10 includes a first seal 74 and a second seal 76 configured to generally prevent fluid 56 within the fluid jacket 28 from undesirably escaping the fluid jacket 28 between the housing 12 and the stator carrier 20. The first seal 74 can be positioned between the outer wall 14 of the housing 12 and the stator carrier 20. The second seal 76 can be positioned between the bearing shield 16 of the housing 12 and the stator carrier 20. In various embodiments, the first seal 74 is positioned radially outboard of the stator 18 of the motor 38 of the electric drive unit 10. In some embodiments, the second seal 76 can be positioned radially inboard of the stator 18 of the motor 38 of the electric drive unit 10. In some implementations, the first seal 74 is positioned radially inboard of the housing 12 and radially outboard of the stator carrier 20, and the second seal 76 is positioned radially inboard of the stator carrier 20 and radially outboard of the housing 12. For example, as illustrated in FIG. 4, the first seal 74 is disposed between and in contact with a portion of the outer wall 14 that is radially outboard of the first seal 74 and a portion of the stator carrier 20 that is radially inboard of the first seal 74. Further, the second seal 76 is positioned between and in contact with a portion of the bearing shield 16 of the housing 12 that is radially inboard of the second seal 76 and a portion of the stator carrier 20 that is positioned radially outboard of the second seal 76.

In operation of an exemplary embodiment of the electric drive unit 10, fluid 56 is conveyed into the first region 30 of the fluid jacket 28 via the fluid inlet 60. The fluid 56 flows in a spiraling manner through the first region 30 of the fluid jacket 28 to the second opening 72 defined by the annular collar 66 of the stator carrier 20. Heat from the stator 18 is transferred through the stator carrier 20 and into the fluid 56 that is flowing through the first region 30 of the fluid jacket 28, such that the stator 18 is cooled. Next, the fluid 56 flows through the second opening 72 defined by the annular collar 66 of the stator carrier 20 from the first region 30 to the second region 32 of the fluid jacket 28 that extends along the second portion 24 of the stator carrier 20 and the bearing shield 16 of the housing 12. Heat is transferred from the gearbox region 36 (e.g., oil within the gearbox region 36) of the housing 12 to the fluid 56 within the second region 32 of the fluid jacket 28 through the bearing shield 16, which extends generally between the fluid jacket 28 and the gearbox region 36. As such, the contents of the gearbox region 36 are maintained at a desirable temperature for operation of the electric drive unit 10. The fluid 56 is then conveyed out of the second region 32 through the fluid outlet 62 into another portion of the fluid circuit 58, wherein the fluid 56 is cooled to a lower temperature.

The electric drive unit 10 of the present disclosure may provide a variety of advantages. First, the fluid jacket 28 having the first region 30 and the second region 32 that extends radially inboard from the first region 30 along the bearing shield 16 allows for heat to be dissipated from both the stator 18 into the first region 30 and the gearbox region 36 into the second region 32. Second, the stator carrier 20 defining the first opening 70 that is elevationally upward of and smaller than the second opening 72 may allow for air bubbles within the fluid 56 to escape, such that the majority of the fluid 56 may smoothly pass through the second opening 72. Third, the stator carrier 20 being an integrally formed single unitary body that does not require any seals in addition to the first seal 74 and the second seal 76 reduces the number of parts necessary to construct the electric drive unit 10 and may result in cost savings.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 electric drive unit
12 housing
14 outer wall
16 bearing shield
18 stator
20 stator carrier
22 first portion
24 second portion
26 radially inboard terminus
28 fluid jacket
30 first region
32 second region
34 motor housing region
36 gearbox region
38 motor
40 central aperture
42 axis
44 rotor shaft
46 bearing
47 dynamic seal
48 first surface
50 second surface
54 rotor
56 fluid
58 fluid circuit
60 fluid inlet
62 fluid outlet
64 rib
66 annular collar
68 at least one opening
70 first opening
72 second opening
74 first seal
76 second seal

What is claimed is:

1. An electric drive unit, comprising:
a housing that includes an outer wall and a bearing shield that extends radially inboard from the outer wall and includes a first surface and a second surface opposite the first surface that defines a gearbox region of the housing that contains a gearset;
a stator disposed within the housing radially inboard of the outer wall; and
a stator carrier having a first portion positioned radially between the stator and the outer wall and extending along the stator and a second portion that extends radially inboard from the first portion to a radially inboard terminus that is positioned radially inboard of the stator, wherein the stator carrier and the housing define a fluid jacket, the fluid jacket having a first region that is defined by the outer wall and the first portion and a second region that is defined by the first surface of the bearing shield and the second portion.

2. The electric drive unit of claim 1, further comprising:
a first seal positioned between the outer wall of the housing and the first portion of the stator carrier, wherein the first seal is positioned radially inboard of the outer wall and radially outboard of the stator; and
a second seal positioned between the bearing shield of the housing and the second portion of the stator carrier, wherein the second seal is positioned radially inboard of the stator carrier and radially outboard of the bearing shield.

3. The electric drive unit of claim 1, wherein the stator carrier is an integrally formed single unitary body.

4. The electric drive unit of claim 1, wherein the first portion of the stator carrier includes at least one rib that spirals along a surface of the stator carrier opposite the stator.

5. The electric drive unit of claim 1, wherein the stator carrier further comprises:
an annular collar press fit with the housing and extending between the first and second regions of the fluid jacket, wherein the annular collar defines at least one opening that allows fluid to flow from the first region to the second region.

6. The electric drive unit of claim 5, wherein the at least one opening defined by the annular collar comprises:
a first opening; and
a second opening positioned at a lower elevation than the first opening, wherein the second opening is larger than the first opening.

7. The electric drive unit of claim 5, further comprising:
a fluid inlet that conveys fluid into the first region of the fluid jacket; and
a fluid outlet that conveys fluid out of the second region of the fluid jacket.

8. An electric drive unit, comprising:
a housing;
a stator disposed within the housing; and
a stator carrier operably coupled with the stator, wherein the housing and the stator carrier define a fluid jacket for conveying fluid, and wherein a portion of the fluid jacket is defined radially inboard of the stator.

9. The electric drive unit of claim 8, wherein the housing comprises:
an outer wall; and
a bearing shield that extends radially inboard from the outer wall, wherein the portion of the fluid jacket that is defined radially inboard of the stator is defined by the stator carrier and the bearing shield.

10. The electric drive unit of claim 9, wherein the stator carrier comprises:
a first portion; and
a second portion that extends radially inboard from the first portion to a radially inboard terminus that is positioned radially inboard of the stator.

11. The electric drive unit of claim 10, wherein the fluid jacket includes a first region that is defined by the outer wall and the first portion and a second region that is defined by the bearing shield and the second portion, wherein the second region includes the portion of the fluid jacket that is defined radially inboard of the stator.

12. The electric drive unit of claim 11, wherein the stator carrier further comprises:
an annular collar press fit with the housing and extending between the first and second regions of the fluid jacket, wherein the annular collar defines at least one opening that allows fluid to flow from the first region to the second region.

13. The electric drive unit of claim 12, wherein the at least one opening defined by the annular collar comprises:
a first opening; and
a second opening positioned at a lower elevation than the first opening, wherein the second opening is larger than the first opening.

14. The electric drive unit of claim 8, further comprising:
a first seal positioned between the housing and the stator carrier radially outboard of the stator; and
a second seal positioned between the housing and the stator carrier radially inboard of the stator.

15. The electric drive unit of claim 14, wherein the first seal is positioned radially inboard of the housing and radially outboard of the stator carrier, and the second seal is positioned radially inboard of the stator carrier and radially outboard of the housing.

16. An electric drive unit, comprising:
a housing;
a stator disposed within the housing; and
a stator carrier disposed about the stator and having an annular collar that abuts the housing and defines a first opening and a second opening that is larger than the first opening and positioned at a lower elevation than the first opening, wherein the stator carrier and the housing define a fluid jacket that includes a first region and a second region that is in communication with the first region via the first and second openings.

17. The electric drive unit of claim 16, wherein the housing comprises:
an outer wall; and
a bearing shield that extends radially inboard from the outer wall, wherein the first region of the fluid jacket is defined by the stator carrier and the outer wall, and the second region of the fluid jacket is defined by the stator carrier and the bearing shield.

18. The electric drive unit of claim 17, wherein a portion of the second region is positioned radially inboard of the stator.

* * * * *